US012154333B1

(12) United States Patent
Plougmann

(10) Patent No.: US 12,154,333 B1
(45) Date of Patent: Nov. 26, 2024

(54) AUGMENTED REALITY ITEM OBSCURING

(71) Applicant: United Services Automobile Association (USAA), San Antonio, TX (US)

(72) Inventor: Lars Plougmann, Austin, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/336,947

(22) Filed: Jun. 16, 2023

Related U.S. Application Data

(63) Continuation of application No. 17/174,969, filed on Feb. 12, 2021, now Pat. No. 11,715,298, which is a continuation of application No. 16/297,309, filed on Mar. 8, 2019, now Pat. No. 10,949,670.

(60) Provisional application No. 62/641,790, filed on Mar. 12, 2018.

(51) Int. Cl.

| | |
|---|---|
| ***G06K 9/00*** | (2022.01) |
| ***G06Q 20/32*** | (2012.01) |
| ***G06Q 30/0283*** | (2023.01) |
| ***G06T 11/00*** | (2006.01) |
| ***G06V 20/20*** | (2022.01) |

(52) U.S. Cl.
CPC ......... *G06V 20/20* (2022.01); *G06Q 20/3224* (2013.01); *G06Q 30/0283* (2013.01); *G06T 11/001* (2013.01)

(58) Field of Classification Search
CPC ..... G06K 9/00771; G06K 2009/00738; G06K 9/00711; G06K 9/00664; G06K 9/00671; G06T 2207/30232; G06T 7/11; G06T 11/001; G06Q 30/0641; G06Q 30/0283; G06Q 20/3224
See application file for complete search history.

(56) References Cited

U.S. PATENT DOCUMENTS

| | | | | |
|---|---|---|---|---|
| 8,725,751 | B1 | 5/2014 | Lai et al. | |
| 10,250,948 | B1 | 4/2019 | Bortz et al. | |
| 10,636,063 | B1 | 4/2020 | Kalaboukis | |
| 10,949,670 | B1 | 3/2021 | Plougman | |
| 2013/0054572 | A1 | 2/2013 | Cummins et al. | |
| 2015/0294385 | A1 | 10/2015 | Grigg et al. | |
| 2018/0091856 | A1 | 3/2018 | Ayers et al. | |
| 2018/0136465 | A1 | 5/2018 | Chi et al. | |
| 2018/0150892 | A1 | 5/2018 | Waldron et al. | |
| 2018/0182025 | A1* | 6/2018 | Smith | G06Q 30/0623 |
| 2019/0149725 | A1 | 5/2019 | Adato et al. | |
| 2019/0206130 | A1* | 7/2019 | Ericson | G06Q 30/0643 |
| 2019/0236531 | A1 | 8/2019 | Adato et al. | |
| 2019/0279407 | A1* | 9/2019 | McHugh | G06F 3/011 |
| 2019/0304506 | A1 | 10/2019 | Michaud et al. | |

(Continued)

*Primary Examiner* — Allahyar Kasraian

(74) *Attorney, Agent, or Firm* — Perkins Coie LLP

(57) ABSTRACT

Augmented reality (AR) technology can be used to perform a real-time overlay on an image displayed on a user device. A user device can receive image data of an area comprising an item from the real-world. Based on the image data, an identity and a value of the item can be obtained by the user device. If the value of the item is greater than a pre-determined value for the item or a category of the item, then the user device can obscure in real-time on the displayed image the item or category of the item having the value that is greater than the pre-determined value.

20 Claims, 7 Drawing Sheets

102

108

106

104

110

(56) References Cited

U.S. PATENT DOCUMENTS

| | | | |
|---|---|---|---|
| 2019/0369722 | A1 | 12/2019 | Lehtiniemi et al. |
| 2022/0410881 | A1 | 12/2022 | Young et al. |

* cited by examiner

AUGMENTED REALITY ITEM OBSCURING

CROSS-REFERENCE TO RELATED APPLICATIONS

This application is a continuation of U.S. patent application Ser. No. 17/174,969, entitled "AUGMENTED REALITY ITEM OBSCURING," now allowed, which is a continuation of U.S. patent application Ser. No. 16/297,309, filed on Mar. 8, 2019, now U.S. Pat. No. 10,949,670 issued Mar. 16, 2021, entitled "AUGMENTED REALITY ITEM OBSCURING," which claims priority to U.S. Provisional Application No. 62/641,790, filed on Mar. 12, 2018, entitled "AUGMENTED REALITY ITEM OBSCURING," all of which are hereby incorporated by reference in their entireties for all purposes.

BACKGROUND

Augmented reality (AR) technology is used to add virtual objects to a digital display to enhance user experience. For example, when a user uses a mobile device equipped with AR technology to look at stars in the sky, the application on the mobile device can add lines to connect stars in a constellation and can add a text identifying the various constellations. Thus, AR technology can be used to add content to a real-world image to enhance user experience.

Figure 1A:
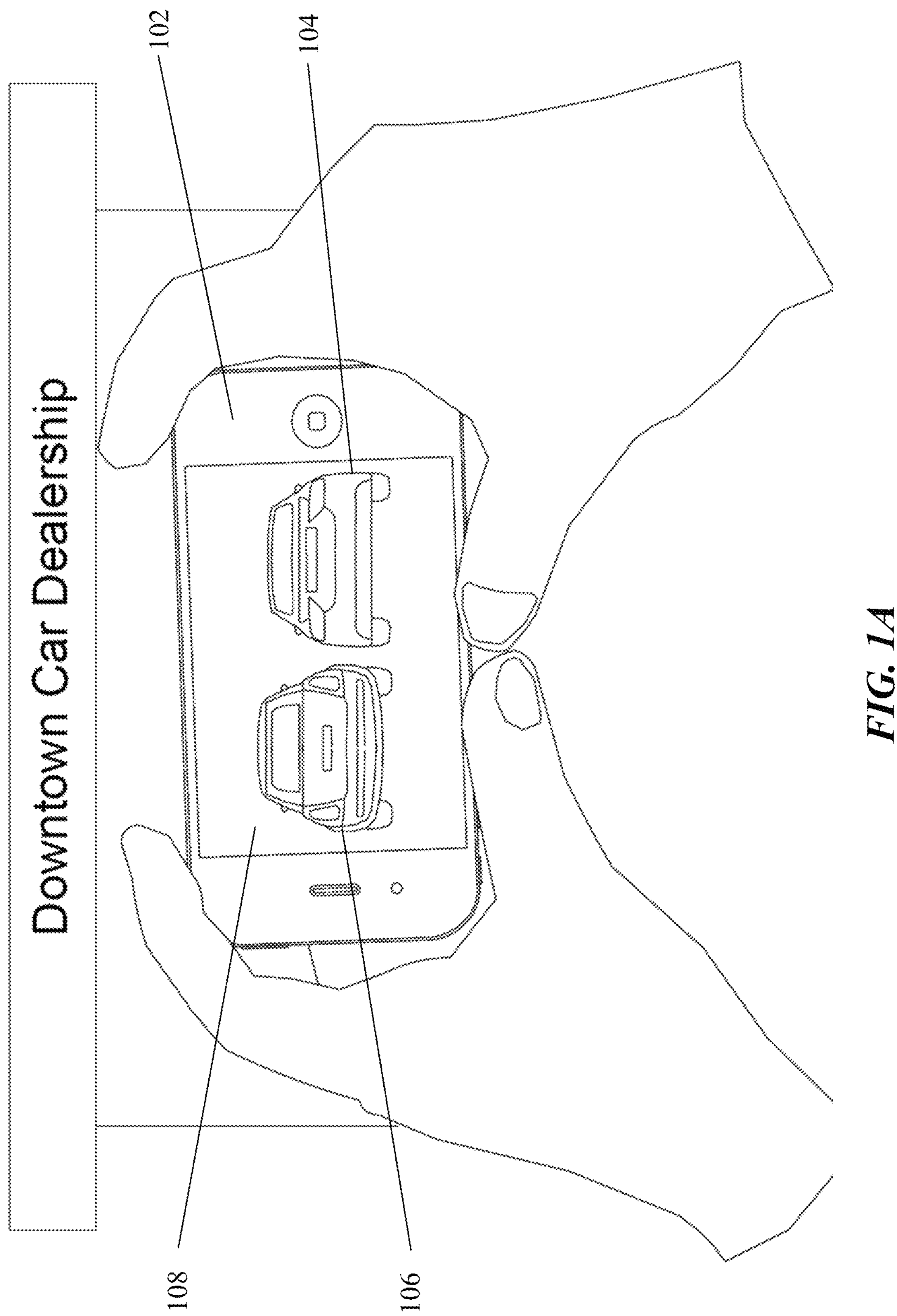
FIG. 1A shows an embodiment where a user device receives image data of a real-world that includes two cars.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

AR technology is generally used to add a layer of information to a display of a real-world image. Thus, AR technology generally increases the amount of information that is presented to the user. The embodiments described in this patent document use AR technology to enhance user experience by reducing the information presented about the real world. In some embodiments, AR technology is used to obscure, hide, or remove certain content from a display to provide a personalized experience to a user for various reasons. For example, the system can obscure items based on the user's financial budget (e.g., certain items are obscured to help the user stay within a budget), health goals (e.g., certain foods are obscured at the grocery store to help the user stick to a diet), environmental or safety goals (e.g., certain items are removed that do not meet safety or environmental standards), or other user preferences.

When shopping on the internet, vendors can offer users a way to filter goods displayed based on a price limit. However, when shopping in the physical world, a user cannot similarly filter his or her choices based on a price of the item or some other criteria. Thus, shoppers can be susceptible to purchasing items outside of their budget or purchasing items that do not meet the user's preferences. Shoppers can also succumb to up-sell tactics from a salesperson. This is especially relevant when shopping for big ticket items such as cars, furniture, or electronics.

Figure 1B:
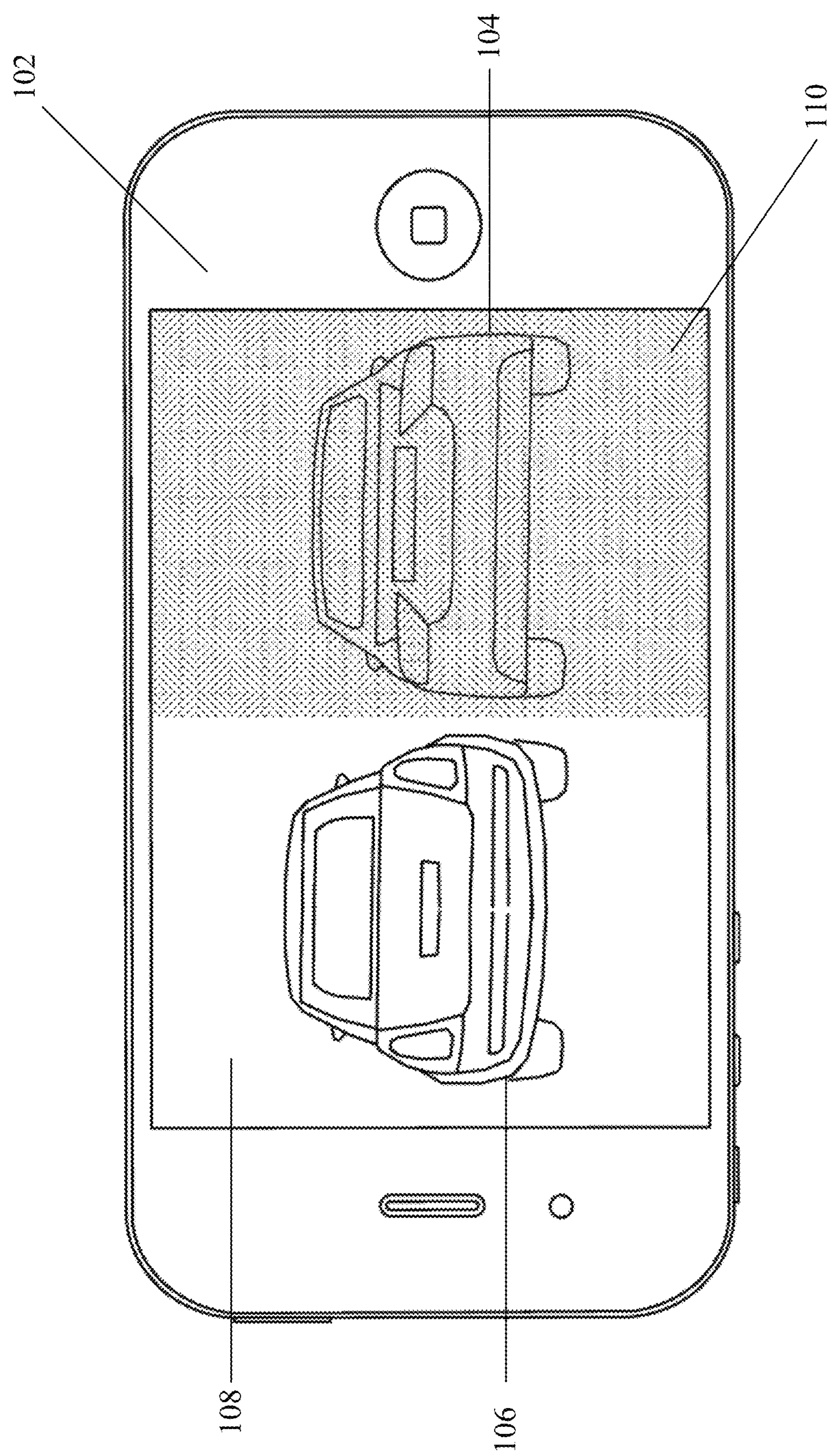
FIG. 1B show an embodiment where one or more items having a value greater than a user's budget is obscured on a display.

FIGS. 1A and 1B show an embodiment where one or more items having a value greater than a user's budget is obscured, or hid, or removed on a display. FIG. 1A shows a user device 102 receiving image data of a real-world that includes two cars 104, 106 parked in a car dealership using a user device 102. The user device 102 can include a phone, a tablet, a digital eyeglass device, or other wearable technology such as a helmet styled device with a visor or a digital contact lens. The user device 102 can receive image data of an area 108 that includes one or more items from the real world. The image data is wirelessly sent by the user device 102 to a server (not shown) that can process the image data to determine the identities and values of the one or more items. In the example shown in FIG. 1, the server determines the identities, values, or other information (e.g., safety, emissions) of the two cars 104, 106 and sends the identity and value information back to the user device 102. The user device 102 and the server can send information to each other using Wi-Fi or cellular signals.

In some embodiments, when shopping for an item, a user can set a maximum pre-determined value for the item or category of item, such as a budget for an item so that the user can determine whether one or more items fall within the user's budget for purchase, or an application can obtain this information from a budget service that is accessed with the user's prior permission. Using the example of FIGS. 1A and 1B, in some embodiments, the user can set a budget for a category, such as a car, or the user can set a budget for an item such as a specific year and model of the car. When the user device obtains the value of the car from the server, the user device can determine whether the value of the car is greater than the user set maximum pre-determined value. In FIG. 1B, the user device 102 is shown as a phone that displays the image of the area 108 comprising two cars 104, 106 and obscures in real-time on the displayed image the car 104 that has a price greater than the user's budget. In some embodiments, an image displayed by the user device can be a moving image, such as a video, so that an item can be obscured in real-time on the moving image. In some embodiments, the user device can be a digital eyeglass device or a tablet.

In some embodiments, a user device can obscure one or more items by blurring the item, graying out the item, or obscuring source-identifying information of the item.

Source-identifying information can include a grill guard on a car, an emblem, or a shape. The obscuring or hiding of one or more items that are outside of the user's budget can better indicate to the user what item or items to choose from to stay within a prescribed budget or other preference.

Various methods can be used to obscure or hide an item. Such methods may be used depending on factors such as the environment of the user, the user's preferences, and the computational capabilities of the software and hardware. Examples of methods of obscuring an item can include:

- obscuring by inserting an opaque polygon into the image or moving video image (the polygon can be white, black or any color),
- obscuring by inserting a semi-transparent polygon into the image or moving video image (the polygon can be white, black or any color tint),
- obscuring by any of the two aforementioned methods and adding text or icons that tells the user which object was recognized and why it is obscured (e.g. item is more expensive than the set budget),
- obscuring by pixelating an object, and
- obscuring by reconstructing the inferred background of an object, giving the impression to the user that the object is not there or that it is invisible.

A benefit of obscuring items for purchase is that it allows the user to make better decisions to meet financial or other goals. Another benefit of obscuring items is that it can help dissuade the user from purchasing more expensive items that exceed the user's budget.

In some embodiments, the area of the augmented reality device that is obscured can be used to recommend other products. In an example, assuming that a sporty car outside the user's budget was blurred, the recommendation area can mention a similar product within the user's budget such as "If you are looking for a sporty car, we recommend an XYZ car."

While FIGS. 1A and 1B disclose an embodiment where a single user device can operate with a server, in some embodiments, a user device can include two devices, such as a mobile device and a display device, that can operate with each other and a server to perform the real-time overlay on an image displayed on the display device. As an example, a display device, such as a digital eyeglass device, can receive image data from a camera and can send the image data to a mobile device, such as a phone or a tablet, that sends the image data to the server. In some embodiments, the server can determine the identity and one or more values or characteristics of the item. When the mobile device receives the one or more values from the server, the mobile device can determine whether an item should be obscured by comparing a value to a pre-determined value as described in this patent document. In other embodiments, the server determines which items should be obscured and the mobile device is simply used as a proxy. If the mobile device (or server) determines that an item should be obscured, the display device, such as a digital eyeglass device, that display the image can obscure in real-time on the displayed image the item. In some embodiments, the mobile device may transmit to the display device information about the area to obscure. In some other embodiments, the display device and the mobile device can work together to form an object understanding of the scene, and after retrieving price and other identifying information about the items, the mobile device can transmit to the display device the shared item identifier of the item to obscure. The mobile device and the display device can communicate with each other using wireless technology, for example, Wi-Fi or Bluetooth.

In some embodiments, a maximum pre-determined value can be set by a user in decision-making contexts other than financial decisions. For example, a user device can obscure one or more items on a supermarket shelf having a number or calories or an amount of sugar that is greater than a maximum pre-determined value set by a user or recommended by a health application or service used by the user. Based on the image data received by the user device and sent to the server, the server can identify and can provide to the user device the nutritional value of the one or more items. The user device can obscure in real-time on the displayed image the one or more items on the supermarket shelf if the user device determines that a nutritional value of the one or more items is out of range compared to a pre-determined range set by a user or recommended by a health application or service used by the user. A benefit of obscuring some food items is that it allows the user to make personalized and better health-related decisions.

In some embodiments, a user can set a minimum pre-determined value for the item or category of item having certain minimum characteristics, for example, a fuel economy of a car, the safety rating of a car, a nutritional value of a food item, a product rating, or date of manufacture of an item. Based on the image data received by the user device and sent to the server, the server can identify and can provide to the user device the minimum characteristics values of the one or more items. The user device can obscure in real-time on the displayed image one or more items if the user device determines that the values of the minimum characteristics of the one or more items is less than a minimum pre-determined value set by a user. In some embodiments, a user can set a budget as a minimum characteristic so that one or more items having a value less than a minimum budget can be obscured to allow a user to view a displayed item having a value that is greater than the minimum set budget.

The minimum or maximum pre-determined value can be set by a user. For example, a user can set a safety rating of 4.0 or above or a fuel economy of 30 miles per gallon or above as a preferred minimum pre-determined value. In some embodiments, a user may set both a minimum and maximum pre-determined value for an item characteristic so that one or more items that fall outside a pre-determined range can be obscured.

The pre-determined values and designations to identify whether the pre-determined values are maximum or minimum values can be stored on an application on the user device or it can be stored on a server to be obtained by the user device. In some embodiments, a server can determine whether a value of an item is greater than a maximum pre-determined value or the server can determine whether a value of an item is less than a minimum pre-determined value. When a server determines that an item should be obscured, the server can send to the user device the identity of an item to be obscured.

From a still or live video image, the server's analysis can identify distinct items or objects as the first part of the analysis of the imagery. Each object can be given an ID that is shared between the various computing devices, such as the server and user devices. In some embodiments, if the device that is receiving the image data about the scene has enough computing power, an instruction can be transmitted to the image data receiving device to obscure one or more object with the corresponding specific IDs. In some embodiments, if a display device receiving the image data about the scene lacks computing power, a mobile device can receive the one or more object IDs to be obscured from the server and the mobile device can translate the one or more object IDs information into one or more areas to obscure and transmit that instruction to the display device.

In some embodiments, before a user device can send image data to a server to obtain information about one or more items in the image data, the user device can determine a location of the user device and ascertain whether the location is associated with a place that performs transactions (e.g., a place that a user can make a purchase). Using the example provided in FIG. 1A, in some embodiments, the user device or server can determine a location of the user device, using, for example, geo-coordinates or latitude and longitude, and ascertain that the particular location is associated with a "Downtown Car Dealership" that sells cars. As described in this patent document, the user device can subsequently receive image data, obtain identities and values of one or more items from a server, compare the value with a pre-determined value, and obscure one or more items based on the comparison. In some other embodiments, user device can provide its location information to a server and the server can ascertain whether a user device is located at a place that a performs transactions. In some embodiments, an identification of one or more objects from an image data and the subsequent determination of which objects to obscure may be performed without obtaining location information.

In some embodiments, the user device or server can provide recommendations to the user in the portion of the augmented reality device with obscured information. The recommendations can include recommendations specific to what is obscured. For example, assuming that a sporty car outside the user's budget was blurred, the recommendation area can mention a similar product within the user's budget such as "If you are looking for a sporty car, we recommend an XYZ car."

Figure 4:
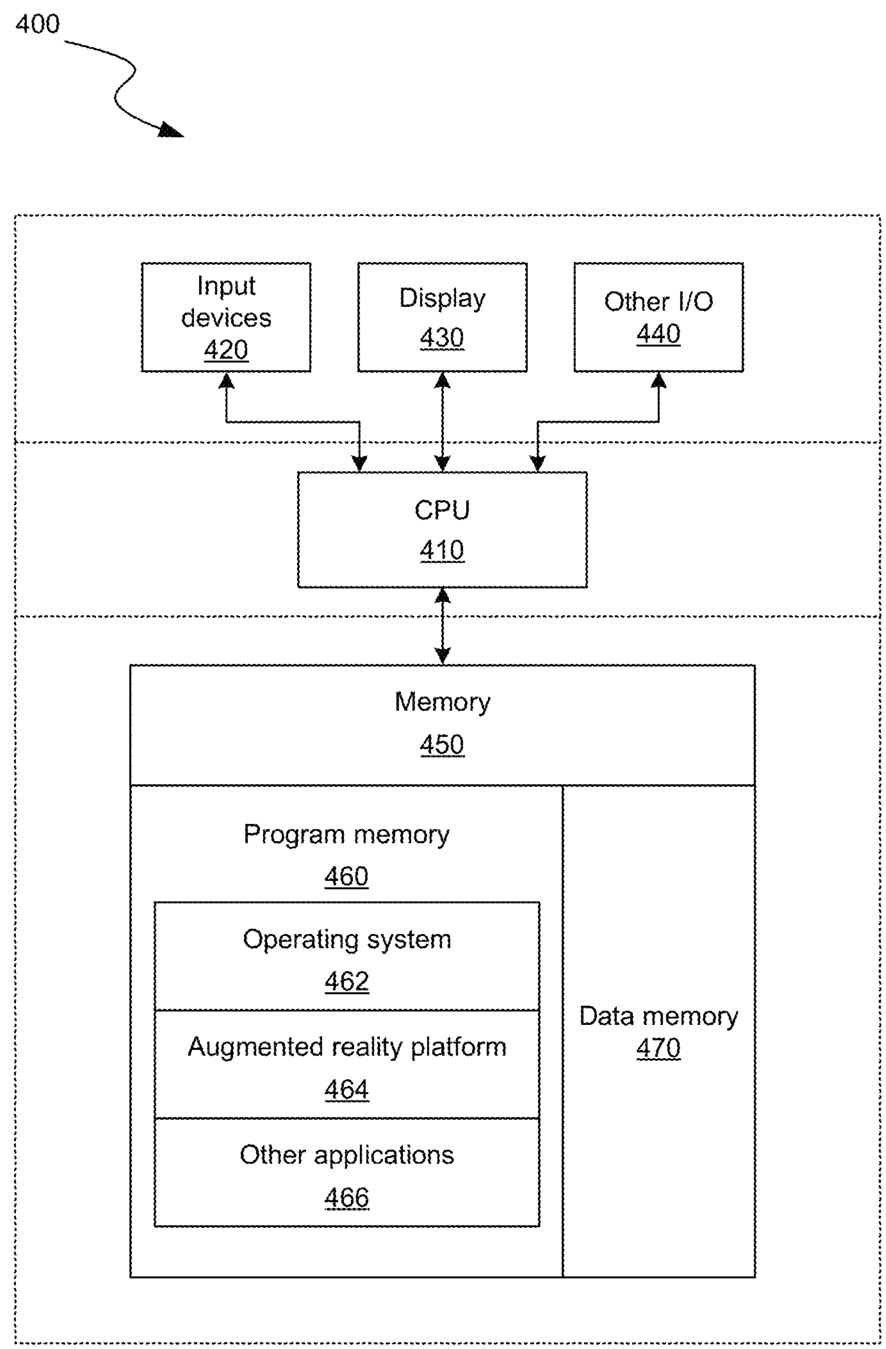
FIG. 4 is a block diagram illustrating an overview of devices on which some implementations can operate.

Those skilled in the art will appreciate that the components illustrated in FIGS. 4-6 described below, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described below can execute one or more of the processes described below.

Figure 2:
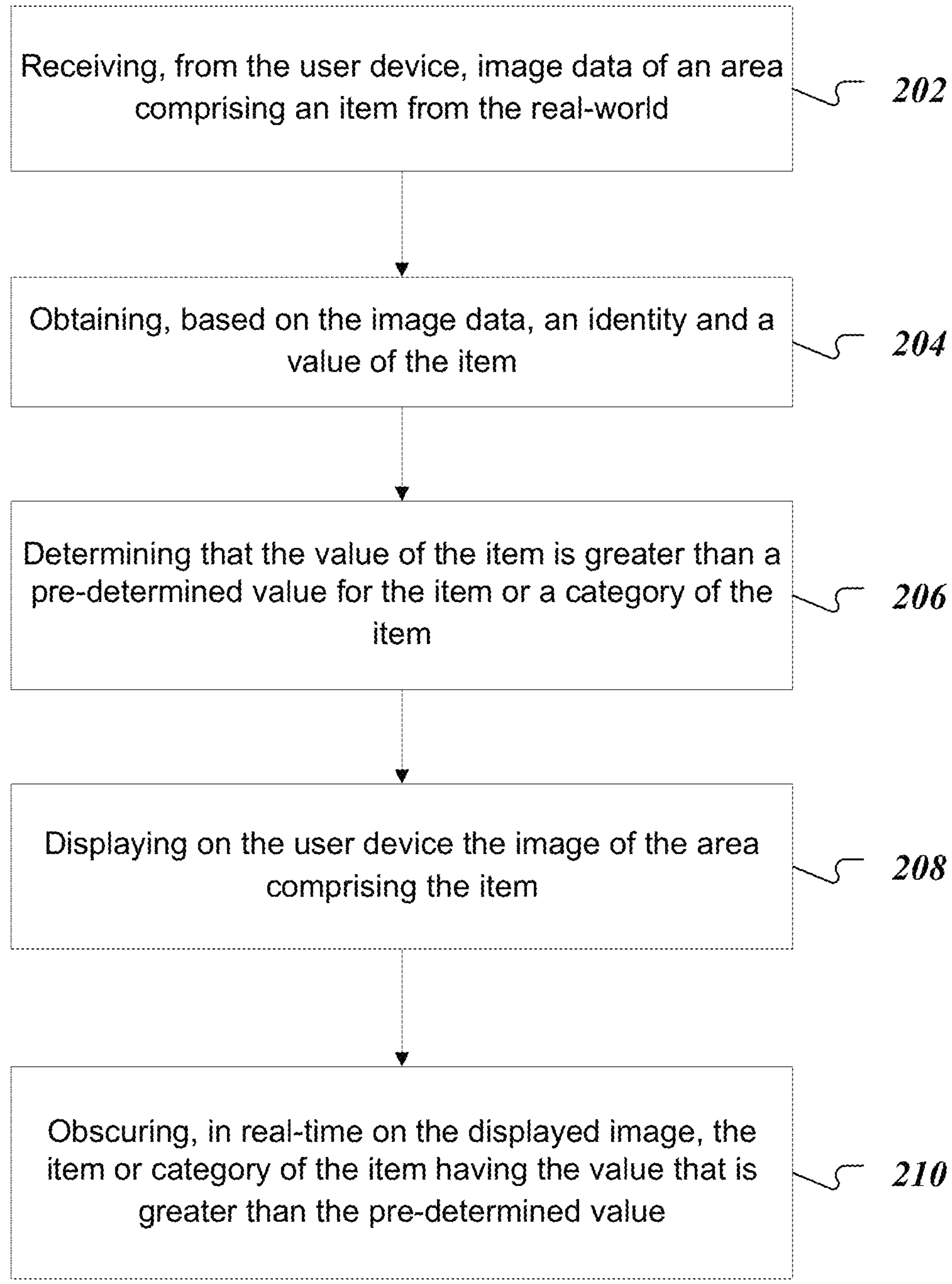
FIG. 2 shows a flowchart for using AR technology to perform a real-time overlay on an image displayed on a user device.

FIG. 2 shows a flowchart for using AR technology to perform a real-time overlay on an image displayed on a user device. At a receiving operation 202, a user device receives image data of an area comprising an item from the real-world. In some embodiments, prior to the receiving operation 202, the user device or server can determine the user device's location and the user device or a server can ascertain that the location of the user device is associated with a place that performs transactions.

At the obtaining operation 204, a user device obtains, based on the image data, an identity and a value of the item. The image data obtained by the user device is sent to a server that determines and sends the identity and value of the item to the user device.

At the determining operation 206, the user device or a server can determine that the value of the item is greater than a pre-determined value for the item or a category of the item. The pre-determined value can be a maximum user preferred value and can include, for example, a budget for the item or the category of the item. The pre-determined value can be set by a user and can be stored on an application on a user device or it can be retrieved by the user device from a server that stores the pre-determined value.

At the displaying operation 208, the user device displays the image of the area comprising the item. At the obscuring operation 210, the user device obscures, in real-time on the displayed image, the item or category of the item having the value that is greater than the pre-determined value. An item can be obscured by blurring the item, graying out the item, or obscuring source-identifying information of the item. In some embodiments, the item is hidden. In other embodiments, a symbol indicating a characteristic is placed on the item (e.g., dollar signs are put over an item that is outside of a user's budget). In some embodiments, the area that is obscured can provide recommendations on substitute or alternative products to the obscured item (e.g., "if you are looking for a set of binoculars, we recommend XYZ brand, model ZZ."

The user device can be a phone, a tablet, a digital eyeglass device, or other wearable device. In some embodiments, a user device can perform the operations associated with FIG. 2 in a continuous routine to allow the user device to perform real-time overlay on moving images.

In some embodiments, a real-time overlay can be performed on an image displayed on a user device based on user defined minimum characteristics. As an example, a minimum characteristic can include a fuel economy of a car, a nutritional value of a food item, a product rating, or date of manufacture of an item. Based on an image data sent to the server, the user device can receive a second value of the item. The user device or the server can determine whether the second value of the item is less than a second pre-determined value for the item or the category of the item. The second-predetermined value is a minimum user preferred value. As an implementation example, the second pre-determined value can also be set by a user and can be stored on an application on a user device or it can be retrieved by the user device from a server that stores the second pre-determined value. The user device can obscure, in real-time on the displayed image, the item or category of the item having the second value that is less than the second pre-determined value.

A user device can run an application to access information from other applications located on the user device or on a server. For example, a user device application with an Application Programming Interface (API) can obtain from a map application location of a user device or information that the user device is located at or near a store, a car dealership, a mall, or a restaurant. The user device application can also use another API to obtain from a server the identities and values of items, such as cars.

Figure 3:
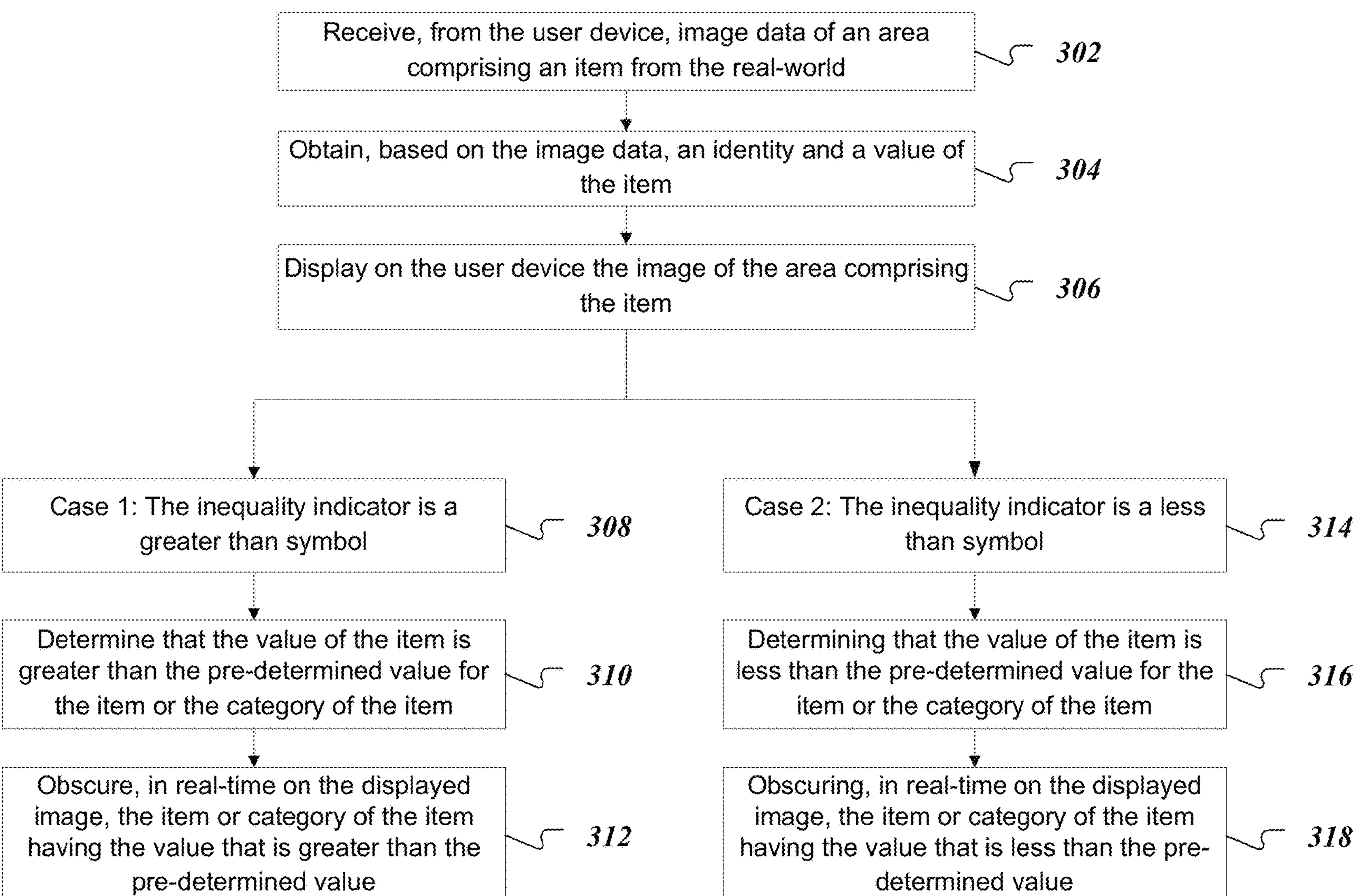
FIG. 3 shows another flowchart for using AR technology to perform a real-time overlay on an image displayed on a user device.

FIG. 3 shows another flowchart for using AR technology to perform a real-time overlay on an image displayed on a user device. At the receiving operation 302, a user device can receive image data of an area comprising an item from the real-world. At the obtaining operation 304, the user device can obtain from a server an identity and a value of the item based on the image data. At the displaying operation 306, the user device can display the image of the area comprising the item.

At the first determining operation 308, a user device or a server can determine whether an inequality indicator that compares the value to a pre-determined value is a greater than symbol. If the inequality indicator is a greater than symbol then the process moves to the second determining operation 310 where a user device or a server can determine that the value of the item is greater than the pre-determined value for the item or the category of the item. At the obscuring operation 312, the user device can obscure, in real-time on the displayed image, the item or category of the item having the value that is greater than the pre-determined value.

At the third determining operation 314, a user device or a server can determine whether the inequality indicator that compares the value to a pre-determined value is a less than symbol. If the inequality indicator is a less than symbol, then the process moves to the fourth determining operation 316 where a user device or a server can determine that the value of the item is less than the pre-determined value for the item or the category of the item. At the obscuring operation 318, the user device can obscure, in real-time on the displayed image, the item or category of the item having the value that is less than the pre-determined value.

The inequality indicator can be provided to the user device from a server or it can be stored on the user device. In some embodiments, a user device can perform the operations associated with FIG. 3 in a continuous routine to allow the user device to perform real-time overlay on moving images.

Several implementations are discussed below in more detail in reference to the figures. Turning now to the figures, FIG. 4 is a block diagram illustrating an overview of devices on which some implementations of the disclosed technology can operate. The devices can comprise hardware components of a device 400 that send image data from an area that includes one or more items from a real-world, receive the identity and characteristics of one or more items, and obscure one or items based on pre-determined values. Device 400 can include one or more input devices 420 that provide input to a CPU (processor) or GPU 410, notifying it of actions. The actions are typically mediated by a hardware controller that interprets the signals received from the input device and communicates the information to the CPU or GPU 410 using a communication protocol. Input devices 420 include, for example, a mouse, a keyboard, a touchscreen, an infrared sensor, a touchpad, a wearable input device, a camera- or image-based input device, a microphone, or other user input devices.

CPU or GPU 410 can be a single processing unit or multiple processing units in a device or distributed across multiple devices. CPU or GPU 410 can be coupled to other hardware devices, for example, with the use of a bus, such as a PCI bus or SCSI bus. The CPU or GPU 410 can communicate with a hardware controller for devices, such as for a display 430. Display 430 can be used to display text and graphics. In some examples, display 430 provides graphical and textual visual feedback to a user. In some implementations, display 430 includes the input device as part of the display, such as when the input device is a touchscreen or is equipped with an eye direction monitoring system. In some implementations, the display is separate from the input device. Examples of display devices are: an LCD display screen; an LED display screen; a projected, three-dimensional, holographic, or augmented reality display (such as a heads-up display device or a head-mounted device); and so on. Other I/O devices 440 can also be coupled to the processor, such as a network card, video card, audio card, USB, FireWire or other external device, camera, printer, speakers, CD-ROM drive, DVD drive, disk drive, or Blu-Ray device.

In some implementations, the device 400 also includes a communication device capable of communicating wirelessly or wire-based with a network node. The communication device can communicate with another device or a server through a network using, for example, TCP/IP protocols. Device 400 can utilize the communication device to distribute operations across multiple network devices.

The CPU or GPU 410 can have access to a memory 450. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 450 can include program memory 460 that stores programs and software, such as an operating system 462, augmented reality platform 464, and other application programs 466. Memory 450 can also include data memory 470 that can include pre-determined values for an item or a category of the item, designations to identify whether the pre-determined values are maximum or minimum values, settings, or preferences, etc., which can be provided to the program memory 460 or any element of the device 400.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 5:
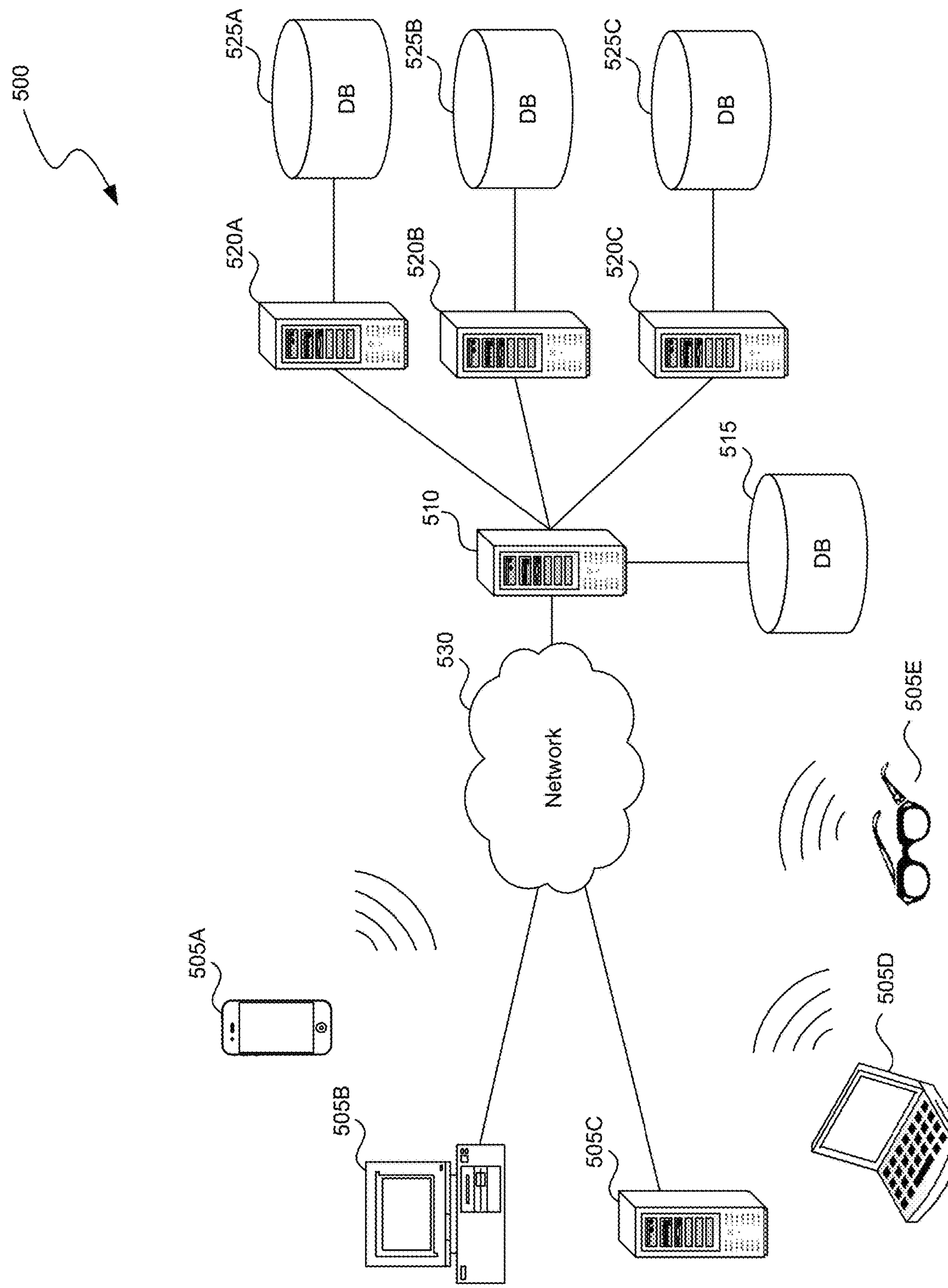
FIG. 5 is a block diagram illustrating an overview of an environment in which some implementations can operate.

FIG. 5 is a block diagram illustrating an overview of an environment 500 in which some implementations of the disclosed technology can operate. Environment 500 can include one or more client computing devices 505A-E, examples of which can include device 400. Client computing devices 505 can operate in a networked environment using logical connections through network 530 to one or more remote computers, such as a server computing device 510.

In some implementations, server computing device 510 can be an edge server that receives client requests and coordinates fulfillment of those requests through other servers, such as servers 520A-C. Server computing devices 510 and 520 can comprise computing systems, such as device 400. Though each server computing device 510 and 520 is displayed logically as a single server, server computing devices can each be a distributed computing environment encompassing multiple computing devices located at the same or at geographically disparate physical locations. In some implementations, each server computing device 520 corresponds to a group of servers.

Client computing devices 505 and server computing devices 510 and 520 can each act as a server or client to other server/client devices. Server 510 can connect to a database 515. Servers 520A-C can each connect to a corresponding database 525A-C. As discussed above, each server 520 can correspond to a group of servers, and each of these servers can share a database or can have their own database. Databases 515 and 525 can warehouse (e.g., store) information such as pre-determined values for an item or a category of the item, designations to identify whether the pre-determined values are maximum or minimum values, identities and characteristics of items, or location information. Though databases 515 and 525 are displayed logically as single units, databases 515 and 525 can each be a distributed computing environment encompassing multiple computing devices, can be located within their corresponding server, or can be located at the same or at geographically disparate physical locations.

Network 530 can be a local area network (LAN) or a wide area network (WAN), but can also be other wired or wireless networks. Network 530 may be the Internet or some other public or private network. Client computing devices 505 can be connected to network 530 through a network interface, such as by wired or wireless communication. While the connections between server 510 and servers 520 are shown as separate connections, these connections can be any kind of local, wide area, wired, or wireless network, including network 530 or a separate public or private network.

Figure 6:
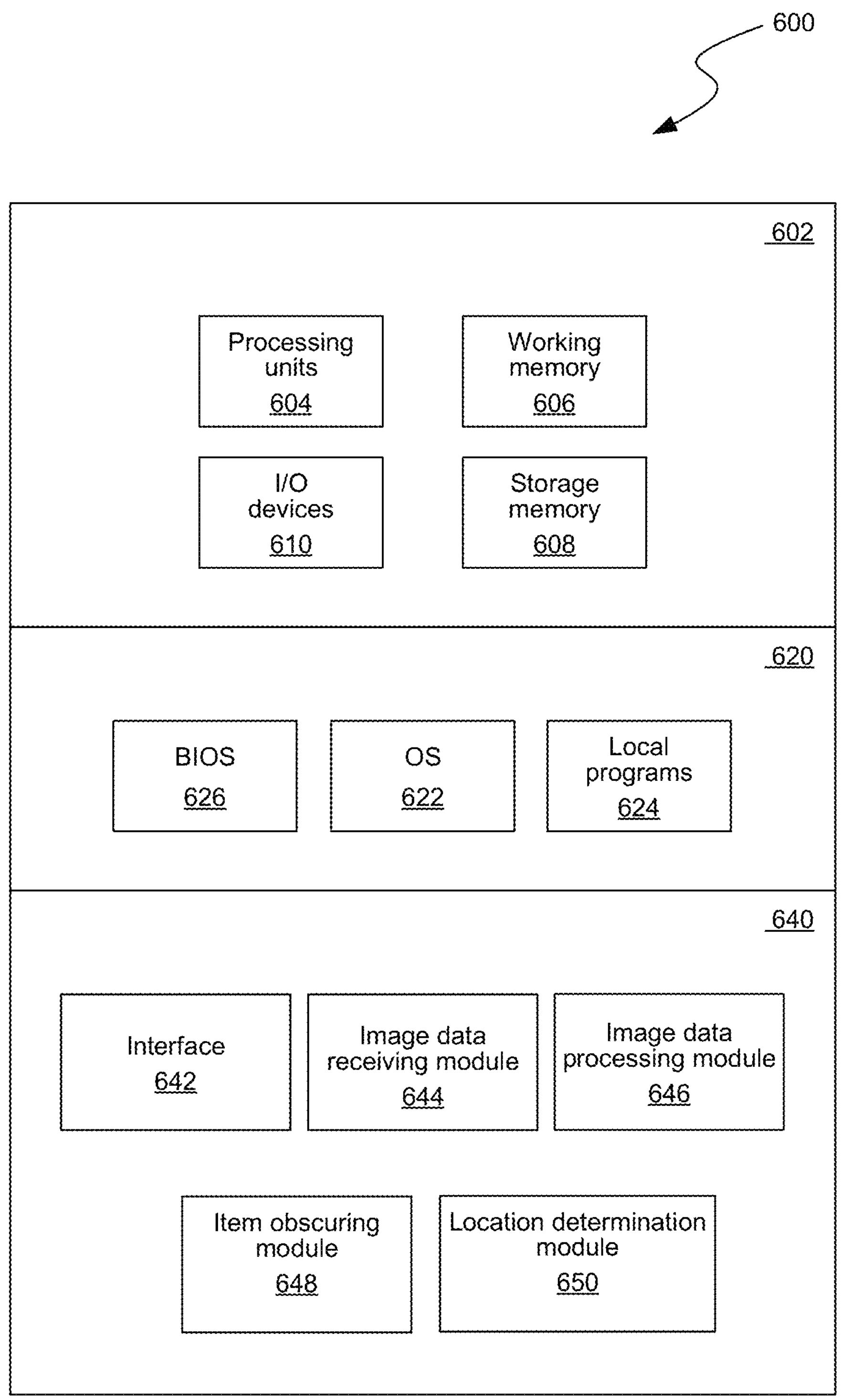
FIG. 6 is a block diagram illustrating components which, in some implementations, can be used in a system employing the disclosed technology.

FIG. 6 is a block diagram illustrating components 600 which, in some implementations, can be used in a system employing the disclosed technology. The components 600 include hardware 602, general software 620, and specialized components 640. As discussed above, a system implementing the disclosed technology can use various hardware, including processing units 604 (e.g., CPUs, GPUs, APUs, etc.), working memory 606, storage memory 608, and input and output devices 610. Components 600 can be implemented in a client computing device such as client computing devices 505 or on a server computing device, such as server computing device 510 or 520.

General software 620 can include various applications, including an operating system 622, local programs 624, and a basic input output system (BIOS) 626. Specialized components 640 can be subcomponents of a general software application 620, such as local programs 624. Specialized components 640 can include an augmented reality platform that includes an image data receiving module 644, image data processing module 646, item obscuring module 648, location determination module 650, and components that can be used for transferring data and controlling the specialized components, such as interface 642. In some implementations, components 600 can be in a computing system that is distributed across multiple computing devices or can be an interface to a server-based application executing one or more of specialized components 640.

Image data receiving module 644 receives image data of an area that includes one or more items from a real world. The image data receiving module 644 can send the received image data to the image data processing module 646 where the image data is be processed to obtain an identity and other characteristics of the items in the image data. The characteristics of the items may include, for example, a cost of the item or other characteristics relevant to the identified items. An example of other characteristics can include fuel economy if the identified item is a car, or a nutritional value if the identified item is a food item, or a consumer rating if the item is television.

Item obscuring module 648 can compare the value of an item included in the image data with a pre-determined value. In some implementations, the pre-determined value can be a maximum user defined value so that the item obscuring module 648 can obscure in real-time on the displayed image the item or category of the item that has a value that is greater than the pre-determined value. In some other implementations, the pre-determined value can be a minimum user defined value so that the item obscuring module 648 can obscure in real-time on the displayed image the item or category of the item that has a value that is less than the pre-determined value. The item obscuring module 648 can obscure an item by blurring the item, graying out the item, or obscuring source-identifying information of the item.

Item obscuring module 648 can also determine how to compare the value of the item with the pre-determined value. In some implementations, an inequality indicator, such as a greater than or less than symbol, can be provided by the item obscuring module 648 based on a user selection of how an item's characteristics can be compared to a user set pre-determined value. For example, if a user wants to purchase a car, the user can set a maximum budget of $20,000, or the value can result from a budgeting software used by the user. The item obscuring module 648 can store or retrieve from a database the maximum budget with a "greater than" symbol to indicate that items over $20,000 are obscured by the item obscuring module 648. As another example, a user can set a pre-determined range of values so that the item obscuring module 648 can obscure one or more items that fall out of the range of the maximum and minimum values that may be set by the user. In some embodiments, items can be categorically obscured or hidden. For example, users can set a preference of obscuring all products made by a certain company.

The location determination module 650 can determine a location of a user device and can ascertain whether the location of the user device is associated with a place that performs transactions, such as financial or purchasing transactions. In some implementations, if the location determination module 650 determines that a user device is located at or near a transaction, the location determination module 650 can initiate a process of receiving image data to be further processed as described in this patent document.

Those skilled in the art will appreciate that the components illustrated in FIGS. 4-6 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

Several implementations of the disclosed technology are described above in reference to the figures. The computing devices on which the described technology may be implemented can include one or more central processing units, memory, input devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

I claim:

1. A method of comprising:

receiving, by a user device, image data of a physical area comprising at least one item for purchase;

obtaining a value of the at least one item for purchase;

determining that the value of the at least one item is greater than a pre-determined value for at least one of the at least one item or a category of the at least one item;

displaying, on the user device, an image of the physical area comprising the at least one item for purchase; and obscuring, in real-time on the image, the at least one item for purchase having the value that is greater than the pre-determined value, wherein the image includes a symbol of at least one characteristic associated with the obscured at least one item.

2. The method of claim 1, further comprising:

displaying, by the user device, an indication specifying why the at least one item is obscured for purchase.

3. The method of claim 1, wherein the at least one item is a first item, the pre-determined value is a first pre-determined value, and the method further comprises:

obtaining a second value of a second item depicted in the image data;

determining that the second value of the second item is less than a second pre-determined value for the second item or a category of the second item, wherein the first pre-determined value and the second pre-determined value define a target purchase value range; and obscuring, in real-time on the image, the second item having the second value that is less than the second pre-determined value.

4. The method of claim 3, wherein the first pre-determined value is a maximum user defined value, and the second pre-determined value is a minimum user defined value.

5. The method of claim 1, further comprising:

determining a location of the user device;

determining that the location of user device is associated with a place that performs transactions; and determining a category for items offered at the place that performs transactions, wherein obtaining the value of the at least one item is based on the category for items offered at the place that performs transactions.

6. The method of claim 1, wherein the at least one item is obscured by any of: blurring the at least one item, graying out the at least one item, or obscuring source-identifying information of the at least one item.

7. The method of claim 1, wherein the pre-determined value is based on a user-defined budget for the at least one item or the category of the at least one item.

8. A system comprising:

one or more processors; and one or more memories storing instructions that, when executed by the one or more processors, cause the system to perform a process comprising:

receiving, by a user device, image data of a physical area comprising at least one item for purchase;

obtaining a value of the at least one item for purchase;

determining that the value of the at least one item is greater than a pre-determined value for at least one of the at least one item or a category of the at least one item;

displaying, on the user device, an image of the physical area comprising the at least one item for purchase; and obscuring, in real-time on the image, the at least one item for purchase having the value that is greater than the pre-determined value, wherein the image includes a symbol of at least one characteristic associated with the obscured at least one item.

9. The system according to claim 8, wherein the process further comprises:

displaying, by the user device, an indication specifying why the at least one item is obscured for purchase.

10. The system according to claim 8, wherein the at least one item is a first item, the pre-determined value is a first pre-determined value, and the process further comprises:

obtaining a second value of a second item depicted in the image data;

determining that the second value of the second item is less than a second pre-determined value for the second item or a category of the second item, wherein the first pre-determined value and the second pre-determined value define a target purchase value range; and obscuring, in real-time on the image, the second item having the second value that is less than the second pre-determined value.

11. The system according to claim 10, wherein the first pre-determined value is a maximum user defined value, and the second pre-determined value is a minimum user defined value.

12. The system according to claim 8, wherein the process further comprises:

determining a location of the user device;

determining that the location of user device is associated with a place that performs transactions; and determining a category for items offered at the place that performs transactions, wherein obtaining the value of the at least one item is based on the category for items offered at the place that performs transactions.

13. The system according to claim 8, wherein the at least one item is obscured by any of: blurring the at least one item, graying out the at least one item, or obscuring source-identifying information of the at least one item.

14. The system according to claim 8, wherein the pre-determined value is based on a user-defined budget for the at least one item or the category of the at least one item.

15. A non-transitory computer-readable medium storing instructions that, when executed by a computing system, cause the computing system to perform operations comprising:

receiving, by a user device, image data of a physical area comprising at least one item for purchase;

obtaining a value of the at least one item for purchase;

determining that the value of the at least one item is greater than a pre-determined value for at least one of the at least one item or a category of the at least one item;

displaying, on the user device, an image of the physical area comprising the at least one item for purchase; and obscuring, in real-time on the image, the at least one item for purchase having the value that is greater than the pre-determined value, wherein the image includes a symbol of at least one characteristic associated with the obscured at least one item.

16. The non-transitory computer-readable medium of claim 15, wherein the operations further comprise:

displaying, by the user device, an indication specifying why the at least one item is obscured for purchase.

17. The non-transitory computer-readable medium of claim 15, wherein the at least one item is a first item, the pre-determined value is a first pre-determined value, and wherein the operations further comprise:

obtaining a second value of a second item depicted in the image data;

determining that the second value of the second item is less than a second pre-determined value for the second item or a category of the second item, wherein the first pre-determined value and the second pre-determined value define a target purchase value range; and obscuring, in real-time on the image, the second item having the second value that is less than the second pre-determined value.

18. The non-transitory computer-readable medium of claim 17, wherein the first pre-determined value is a maximum user defined value, and the second pre-determined value is a minimum user defined value.

19. The non-transitory computer-readable medium of claim 15, wherein the operations further comprise:

determining a location of the user device;

determining that the location of user device is associated with a place that performs transactions; and determining a category for items offered at the place that performs transactions, wherein obtaining the value of the at least one item is based on the category for items offered at the place that performs transactions.

20. The non-transitory computer-readable medium of claim 15, wherein the at least one item is obscured by any of: blurring the at least one item, graying out the at least one item, or obscuring source-identifying information of the at least one item, and wherein the pre-determined value is based on a user-defined budget for the at least one item or the category of the at least one item.

* * * * *